(12) United States Patent
Chapalain

(10) Patent No.: US 8,709,559 B2
(45) Date of Patent: Apr. 29, 2014

(54) PACKAGING ARTICLE

(75) Inventor: Florian Chapalain, Wigton (GB)

(73) Assignee: Innovia Films, Ltd., Wigton, Cumbria (GB)

( * ) Notice: Subject to any disclaimer, the term of this patent is extended or adjusted under 35 U.S.C. 154(b) by 23 days.

(21) Appl. No.: 13/425,968

(22) Filed: Mar. 21, 2012

(65) Prior Publication Data

US 2012/0201983 A1    Aug. 9, 2012

Related U.S. Application Data

(63) Continuation of application No. 12/673,556, filed as application No. PCT/GB2008/050676 on Aug. 7, 2008, now Pat. No. 8,182,889.

(30) Foreign Application Priority Data

Aug. 23, 2007   (GB) .................................. 0716456.9

(51) Int. Cl.
*B32B 27/06* (2006.01)
*B65D 30/00* (2006.01)

(52) U.S. Cl.
USPC .................. 428/35.2; 428/35.7; 428/355 RA; 383/210

(58) Field of Classification Search
USPC .............. 428/35.7, 349, 336, 481, 35.2, 41.7, 428/41.8, 355 R; 220/361; 383/210
See application file for complete search history.

(56) References Cited

U.S. PATENT DOCUMENTS

| 7,109,070 B2 | 9/2006 | Behle et al. |
| 2001/0026874 A1 | 10/2001 | Karhuketo et al. |
| 2011/0163101 A1* | 7/2011 | Deng .......................... 220/361 |

FOREIGN PATENT DOCUMENTS

| EP | 1767465 A | 3/2007 |
| JP | 07315433 A | 12/1995 |
| JP | 2003048964 A | 2/2003 |
| WO | 93/11937 A1 | 6/1993 |
| WO | 94/09210 A1 | 4/1994 |
| WO | 96/31347 A1 | 10/1996 |
| WO | WO02-077080 | * 10/2002 |
| WO | 2006/053936 A1 | 5/2006 |

OTHER PUBLICATIONS

English machine translation of JP 08092359 to Aoyama et al.
International Plastics Handbook, Hanser publishers, 2006, Chapter 7, p. 701.
English Abstract of JP08092359 (Apr. 1996) to Aoyama et al.
International Preliminary Report on Patentability (Chapter 1 of the Patent Cooperation Treaty) for PCT/GB2008/05067 dated Mar. 4, 2010.
Database WPI Week 200479; Thomson Scientific, London, GB; AN 2004-799527 XP002512341; Nov. 4, 2004.
Database WPI Week 200743; Thomson Scientific, London, GB; AN 2007-441833 XP002512342; Mar. 22, 2007.
Database WPI Week 200470; Thomson Scientific, London, GB; AN 2004-712609 XP002512343; Oct. 7, 2004.

* cited by examiner

*Primary Examiner* — Ellen S Raudenbush
*Assistant Examiner* — Yan Lan
(74) *Attorney, Agent, or Firm* — Ping Wang; Andrews Kurth LLP

(57) ABSTRACT

The invention relates to a packaging article for use in form-fill-seal, flow wrap and lidding. In particular, the invention concerns such an article sealed with a biodegradable film having a peel sealable coating thereon, and coated filmic lids for sealing polylactic acid (PLA) trays and specifically PLA trays used for packaging.

14 Claims, 2 Drawing Sheets

PACKAGING ARTICLE

This application is a continuation application of U.S. patent application Ser. No. 12/673,556, filed Jun. 28, 2010 now U.S. Pat. No. 8,182,889 which claims priority to International Patent Application No. PCT/GB2008/050676, filed Aug. 7, 2008, and which claims priority to United Kingdom Patent Application No. 0716456.9, filed Aug. 23, 2007. The entirety of all of the aforementioned applications is incorporated herein by reference.

FIELD

The present invention relates to a packaging article, in particular, to a packaging article formed from a biodegradable film having a peel sealable coating thereon, which may have applications in various types of packaging regimes, including form-fill-seal, flow wrap and lidding, in which latter connection the invention also concerns and a coated filmic lid for sealing polylactic acid (PLA) and other biodegradable and/or biopolymer trays, particularly relatively rigid trays.

BACKGROUND

Such films are used hermetically to seal and protect products inside the container from exposure to the atmosphere. Generally such films and packaging are formed from plastics such as PET Mylar OLAF. However, it is well known that plastic packaging materials derived from such plastic based materials pose various environmental issues in that they are not biodegradable nor formed from renewable sources.

On the other hand, PLA and biopolymer based packaging materials are particularly attractive as sustainable alternatives to petrochemical-derived plastic products, since the materials from which they are derived are from renewable sources. In the case of PLA for example, the lactate from which PLA is ultimately produced can be derived from the fermentation of agricultural by-products such as corn starch or other starch-rich substances like maize, sugar or wheat. PLA therefore provides an environmentally friendly alternative to petrochemical based plastics in that they are biodegradable and can be manufactured from renewable sources. Other suitably rigid container-forming materials which have been proposed include other biodegradable starch-based materials, cellulosic materials and biodegradable synthetic materials.

Containers made from rigid PLA based materials are typically formed with an open top which is then sealed with a film lid to enclose the contents in the container. To open the container the lid is peeled from the container; the lid and container are eventually discarded. Filmic lids for attaching to such containers suffer from a number of problems, such as providing adequate strength of seal between the filmic lid and the container and misting of the filmic lid following sealing with the container.

The adhesion of the film coating to the container when wet can lead to stringing and/or peeling of the coating. In addition certain materials are only suitable for sealing container openings no longer than 10 cm. Also, weld sealing can occur, causing the film to break or tear in the seal area, creating inconvenience for the consumer opening the pack.

Currently, a coated PET film Mylar OLAF provides the best performance in terms of peel seal and anti-misting properties. However, such filmic lids are not biodegradable and are not manufactured from renewable sources.

BRIEF DESCRIPTION OF THE DRAWINGS

The invention will now be more particularly described with reference to the following Figures, in which.

DETAILED DESCRIPTION

Figure 1:
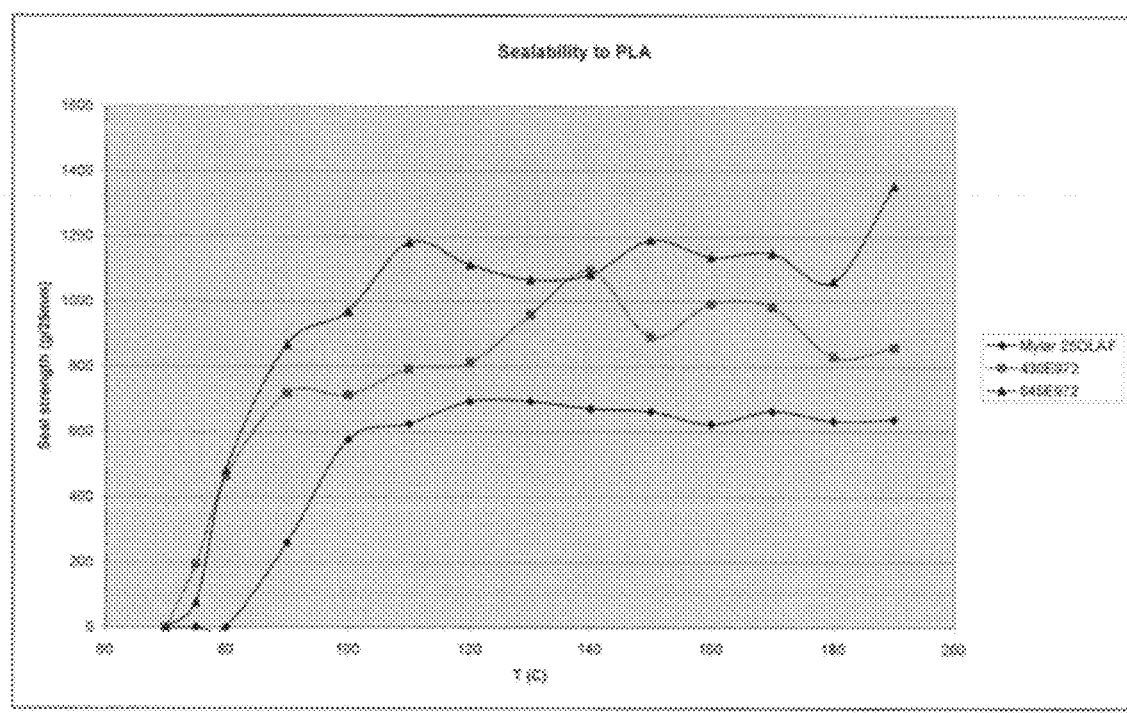
FIG. 1 illustrates the heat seal strength results for seal temperatures between 70 and 190° C. of certain coated films useful in packaging articles in accordance with the invention.

The present invention seeks to provide a filmic lid for attachment to PLA and other biopolymer based containers having advantages over such known lids so as to provide greater anti-misting properties, higher seal strengths but still providing easy pack opening, reasonable moisture/water resistance, controlled moisture permeability and having the capability to cover wider areas of PLA containers, so that the container size and shape is not unnecessarily limited.

According to the present invention there is provided a packaging article comprising a peel seal film comprising a substantially biodegradable substrate and a coating comprising at least one copolymer of lactic acid and caprolactone, the peel seal film being sealed to itself and/or to a secondary substrate in a peelable manner to enclose a packaged product.

The substantially biodegradable substrate may be selected from any suitably film-forming biodegradable material, or from mixtures of two or more thereof. Suitable materials include cellulose and cellulosic derivatives, polymers of lactic acid and its derivatives, including PLA itself, polymers of hydroxyalkanoates (PHAs), biodegradable copolyesters, polycaprolactones and starch-based materials. The substrate material may comprise a true biopolymer (cellulose or PLA for example), or suitably biodegradable synthetic polymers or suitable mixtures of two or more thereof. Preferred substrate materials include cellulose and cellulose derivatives. One suitable cellulosic substrate is a food-approved, biodegradable film available from Innovia Films Ltd under the trade name Natureflex™ The substantially biodegradable substrate preferably comprises a cast film. The film coating of the invention is preferably applied to the film after or during casting thereof.

The coating comprises a copolymer of lactic acid and caprolactone and suitable such copolymers are selected to provide the coated film with satisfactory peel seal characteristics. One preferred coating in accordance with the invention comprises a blend of two or more copolymers of lactic acid and caprolactone. Suitable copolymers for use in the coating composition singly or as part of a suitable blend include Vyloecol BE450™, Vyloecol HYD-306™, Vyloecol BE-910™, Vyloecol BE400™ and Vyloecol BE410™ available from Toyobo Co., Ltd, and mixtures thereof.

Preferably the T9 of the copolymer, or blend of copolymers, is selected to be in the range of from about −10° C. to about 50° C.

The molecular weight of the copolymer, or blend of copolymers, is preferably selected to be in the range of from about 20,000 to about 50,000.

The hydroxyl group value of the copolymer, or blend of copolymers, is preferably from about 2 (KOH mg/g) to about 15 (KOH mg/g), more preferably from about 3 to about 11 (KOH mg/g). Coated biodegradable films of the type described are found to be heat-sealable (for example at seal temperatures of from about 80° C. to about 180° C.), to form such seals on PLA substrates with satisfactory seal strength and with satisfactory peelability.

The coated films used in the packaging article of the invention are preferably transparent, with wide angle haze of less than about 10%, more preferably less than about 8%, most preferably less than about 6%.

Characteristics of the coated films used in the packaging article of the invention such as moisture barrier, aroma barrier, peel seal window, transparency, coating adhesion, ant mist and other properties can be improved or adjusted by choosing or blending in an appropriate ratio the copolymers or by incorporating one or more further additives into the coating composition.

In one coated film in accordance with the invention, the coating composition comprises nitrocellulose, preferably in an amount of less than about 40% w/w, more preferably less than about 30% w/w, and most preferably less than about 20% w/w of the dry weight of the coating composition.

The coated films used in the packaging article of the invention may also or instead comprise one or more waxes, preferably in an amount of less than 10% w/w., more preferably less than about 5% w/w, and most preferably less than about 4% w/w of the dry weight of the coating composition. Suitable waxes include Distec wax, paraffin wax, carnauba wax, candelilla wax, montan waxes, micro crystalline waxes and others.

Another additive which may desirably be incorporated in the coating composition is an antiblock additive, preferably present in an amount of less than about 5% w/w, more preferably less than about 4% w/w, and most preferably less than about 3% w/w of the dry weight of the coating composition. Preferred antiblock additives include mineral agents such as silica and calcined kaolin.

One coated film in accordance with the invention also or instead comprises in the coating composition at least one styrenic copolymer, preferably in an amount of less than about 3% w/w, more preferably less than about 2% w/w, and most preferably less than about 1% w/w of the dry weight of the coating composition.

The coating composition is preferably applied to the substrate from a solution of the dry weight component(s) in a suitable solvent or solvent mixture. The coating composition may also comprise one or more compatibilizers such as ester gum and/or dymerex resin.

Also provided in accordance with the invention is a packaging article in which the secondary substrate is part of the packaging article formed from PLA or from a composition comprising PLA. In one embodiment of the invention, the packaging article is a container having at least one opening, and the peel seal film is sealed over said opening to close the container in an openable fashion.

In a further embodiment a biodegradable film may be coated with the coating composition, and the coated film sealed to a suitable substrate, which in a lidding application may be a relatively rigid tray formed of polylactic acid or other suitably biodegradable material or, in other packaging applications to itself or to some other suitable substrate. Preferably the seal strength of the coated cellulose film to the substrate is greater than 300 g/25 mm, more preferably greater than 400 g/25 mm, still more preferably more than about 500 g/25 mm, and most preferably more than about 600 g/25 mm.

Preferably, the peel seal film of the invention is certifiably biodegradable. This means either that the film is completely biodegradable, or the total weight of nonbiodegradable components in the film is sufficiently low for the film as a whole to be considered biodegradable according to conventional standards at the present time.

Figure 2:
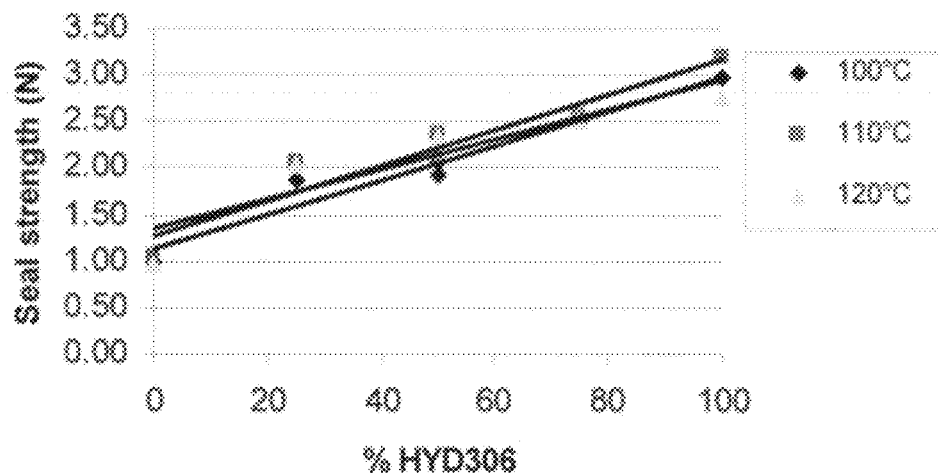
FIG. 2 shows linear trends in the evolution of dry sealability level with increasing level of copolymer of certain films useful in packaging articles in accordance with the invention.
Figure 3:
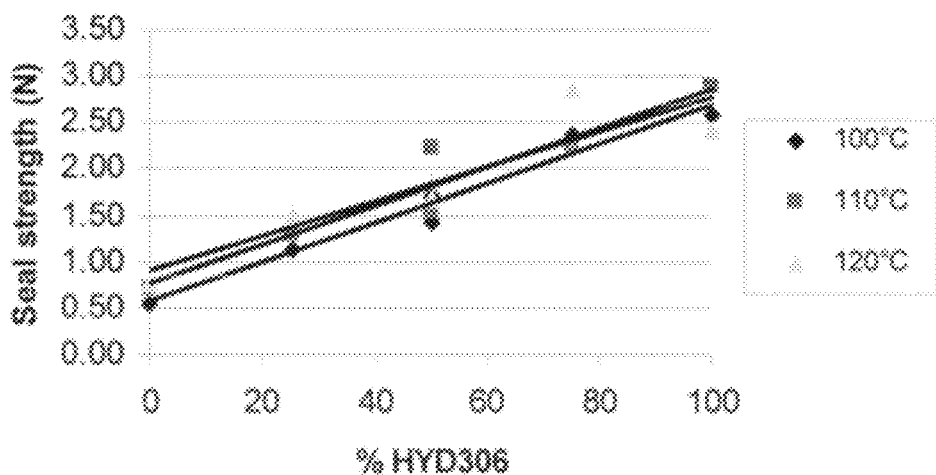
FIG. 3 shows linear trends in the evolution of wet sealability level with increasing level of copolymer of certain films useful in packaging articles in accordance with the invention.

The invention will now be more particularly described with reference to the following Figures and Examples, in which:

FIG. 1 illustrates the heat seal strength results for seal temperatures between 70 and 190° C. of certain coated films useful in packaging articles in accordance with the invention;

FIG. 2 shows linear trends in the evolution of dry sealability level with increasing level of copolymer of certain films useful in packaging articles in accordance with the invention; and FIG. 3 shows linear trends in the evolution of wet sealability level with increasing level of copolymer of certain films useful in packaging articles in accordance with the invention.

The films of these Examples were formed by coating a cellulosic film with a coating formed of a solution of copolyester e.g. Toyobo copolyester BE-450 and/or HYD306 (copolymers of lactic acid and caprolactone), Distec wax, antiblock and nitrocellulose (supplied as Walsroder NC-chips AM750 (including 20% plasticizer ODPP) by Bayer PLC, manufactured by Wolff Cellulosics GmbH & Co KG), and is some cases Scripset 520.

These films were found to be sealable to PLA substrates using a range of temperatures from 80 to 180° C. and the coating was found to adhere well to the cellulosic substrate. The wide angle haze, heat sealability, both wet and dry seals, onto PLA substrates, and moisture barrier of the films has been evaluated. Heat seal parameters have been evaluated using a heat sealer combined with a heat seal puller and/or a Hounsfield tensile machine for films of varying coat weights for temperatures between 80 and 140° C. on thermoforming substrates, sealed with a rectangular lidding pattern with a pressure of 50 psi for 0.5 secs using a tray lidding equipment. Moisture barriers of the films have been evaluated at 25° C. and 75% humidity for 24 hours. The cold fog conditions of film of the present invention were evaluated by lidding a beaker containing 200 ml of water with a film under test.

EXAMPLE 1

A coating solution was prepared by blending a polylactic acid/caprolactone copolymer, available as Vyloecol (R) BE-450 supplied by Toyobo with nitrocellulose at weights between 10% and 30%, 3% Distec wax and 2% calcined kaolin (also known as in Infilm) in solution. A cellophane reel is coated with this solution. A coating pilot-line equipment was used to provide six samples with various level of coat gain named 1 to 6 and an additional lab draw-down equipment sample was produced comparatively. The coat weight of the samples ranged from 1.22 g/m$^2$ to 2.67 g/m$^2$. For each coat weight 25 mm wide film samples were then heat sealed onto PLA substrates at the temperatures of 80, 100, 120 and 140° C., each at a pressure of 50 psi for a time of 0.5 seconds using a normalized heat sealer.

Average results for wide angle haze, heat seal strength and Water Vapour Permeability measurements are set out in Table 1 below. It can be seen that the percentage wide angle haze value increases with increasing coat weight, sample #1 having the lowest coat weight and sample #6 having the highest coat weight. The wide angle haze value was also found to be dependant on the percentage of nitrocellulose in the coating. Heat seal strength is affected by the sealing temperature but not by the coat gain.

Water Vapour Permeability has been tested using a cup filled with silica bits and covered with a layer of coated film.

Silica bits absorbs moisture hence the difference of weight of the cup before and after putting into a chamber controlled in temperature and humidity (here 25° C., 75% Relative Humidity) allows to give an indication of the permeability of the film.

Water Vapour Permeability is seen to be significantly reduced with increasing coat weight.

TABLE 1

Evolution of the properties of the film with the level of coat gain

| Sample | Coat gain ($g/m^2$) | Wide Angle Haze (%) | Heat Seal Strength- 80° C. | Heat Seal Strength- 100° C. | Heat Seal Strength- 120° C. | Heat Seal Strength- 140° C. | Water Vapour Permeability ($g/m^2/24$ h) |
|---|---|---|---|---|---|---|---|
| #1 | 1.28 | 1.7 | 192 | 339 | 506 | 723 | 1045 |
| #2 | 1.22 | 1.9 | 253 | 392 | 546 | 812 | 1007 |
| #3 | 1.32 | 2.3 | 161 | 439 | 541 | 779 | 969 |
| #4 | 1.58 | 2.5 | 194 | 354 | 501 | 729 | 758 |
| #5 | 1.63 | 2.7 | 189 | 368 | 553 | 759 | 691 |
| #6 | 2.02 | 3.1 | 262 | 508 | 629 | 785 | 667 |
| Draw-Down | 2.67 | 7.4 | 218 | 383 | 498 | 561 | 415 |

FIG. 1 illustrates the heat seal strength results for seal temperatures between 70 and 190° C. In FIG. 1, Sealability of 30 (430) and 45 (645) micron films coated with formulated coatings including a blend of 2 Vyloecol copolyesters. Mylar 25OLAF is taken as a control.

It was found that the seal strength between the film and the PLA substrate is not influenced by the coat weight and a wide range of seal temperatures 100 to 140° C. can be found for each sample leading to a sealability of >300 g/25 mm onto the substrates. Adhesive failure between the coating and the thermoforming substrate is observed, i.e. when the film is removed from the substrates no strings of coating or residues remain on the substrate and the film doesn't tear. Following cold-fog evaluation for the film according to the present invention no wrinkling was observed after 7 days. Initially misting appears on the side of the sealed film adjacent the water in the beaker. However, approximately 6 hours maximum post sealing, the film becomes clear. The wet sealability of the film according to the present invention with PLA substrates has led to an improved sealable and peelable coating. Films were sealed onto flat sheet PLA and entirely immersed into water for 30 secs prior to seal strength measurements. Seal strength measurements were performed using a Hounsfield tensile machine.

A Mylar OLAF film has been used as a control sample. For each film tested loss of sealability is an average of the difference of seal strengths between wet and dry seals at three different seal temperatures.

EXAMPLE 2

The formulation in Example 1 was repeated for another copolymer of lactic acid and caprolactone, namely HYD-306, supplied also by Toyobo. A commercial Mylar 25OLAF type of film supplied by Dupont Teijin was used as a control. For each of these formulations of coating lacquer a wide window of heat sealability of approximately 100 to 140° C. was observed together with seal strengths of >300 g/25 mm. Especially, formulated coatings using Toyobo copolyesters allows to reach similar or higher levels of sealability compared to a Mylar 25OLAF film.

PLA and PLA blended thermoforming sheets used herein are available from Huhtamaki and Stanelco under the trade name Starpol SP2000 and the sealability has been evaluated using the heat sealer and heat seal puller. Good sealability (>300 g/25 mm) was found for all of the examples discussed above.

EXAMPLE 3

Wet sealability of the films according to the present invention with PLA trays has lead to an improved sealable and peelable coating. Coated films with same formulation as in Example 1 Films were sealed at various temperature with a pressure of 80 psi and 0.5 s dwell time onto flat sheet PLA by Huhtamaki using a tray lidding machine with a rectangular shape sealing area. Comparison between the average seal strength of "dry" sheets/films and sheets/films entirely immersed into tap water for 30 sec prior to seal strength measurements has been done to evaluate wet resistance of the coating. Seal strength measurements were performed using the Hounsfield tensile machine. A Mylar OLAF film has been used as a control sample. For each film tested loss of sealability is an average of the difference of seal strengths between wet and dry seals at three different seal temperatures. Results are summarized in table 2.

TABLE 2

Wet sealability resistance of coatings

| Seals to Huhtamaki substrates | Average seal strength (N) - 100° C. | Average seal strength - 120° C. | Average seal strength - 140° C. | % sealability remaining |
|---|---|---|---|---|
| BE450 based coating - dry | 2.9 | 2.7 | 2.7 | 89% |
| BE450 based coating - wet | 2.4 | 2.4 | 2.6 | |
| HYD306 based coating - dry | 4.6 | 4.3 | 4.5 | 70% |
| HYD306 based coating - wet | 3.0 | 3.4 | 3.0 | |
| Mylar 25OLAF - dry | 2.1 | 2.8 | 3.8 | 62% |
| Mylar 25OLAF - wet | 0.9 | 2.0 | 2.8 | |

The percentage sealability remaining between wet and dry measurements was 89% and 70% respectively for BE450 and HYD306 based coatings, compared with a figure of 62% for the Mylar OLAF control sample. Moreover, HYD306 provides highest seal strength of those films in dry and wet conditions.

EXAMPLE 4

Blends of copolyesters BE450 and HYD306 has been done in order to get best performances in terms of sealability with a reduction in hot block level for processability. The rest of the formulation remains similar as the one described in Example 1.

Dry and wet sealability have been evaluated using empty and 100 cl filled trays supplied by Autobar. Seals have been realized using tray lidding equipment set at various temperatures, with a pressure of 80 psi and 0.5 s dwell time. Trays have been placed in chilled cabinet set at 0° C. for 24 h prior to seal strength testing. Table 3 and 4 summarized the results of this study.

TABLE 3

Properties of coatings based on blend of BE450/HYD306

| Seals to Autobar rectangular empty trays | Hot block (g/50 mm) | Average seal strength - 100° C. | Average seal strength - 110° C. | Average seal strength - 120° C. |
|---|---|---|---|---|
| 100% BE450 based coating | 0 | 0.98 | 1.05 | 0.98 |
| 75% BE450/ 25% HYD306 based coating | 2.5 | 1.87 | 2.06 | 2.04 |
| 50% BE450/ 50% HYD306 based coating | 5 | 2.08 | 2.36 | 2.29 |
| 25% BE450/ 75% HYD306 based coating | 7.5 | 2.51 | 2.55 | 2.50 |
| 100% HYD306 based coating | 20 | 2.97 | 3.19 | 2.76 |

TABLE 4

Properties of coatings based on blend of BE450/HYD306

| Seals to Autobar rectangular filled with water trays | Average seal strength - 100° C. | Average seal strength - 110° C. | Average seal strength - 120° C. |
|---|---|---|---|
| 100% BE450 based coating | 0.56 | 0.72 | 0.77 |
| 75% BE450/ 25% HYD306 based coating | 1.13 | 1.28 | 1.52 |
| 50% BE450/ 50% HYD306 based coating | 1.72 | 2.22 | 1.67 |
| 25% BE450/ 75% HYD306 based coating | 2.37 | 2.26 | 2.86 |
| 100% HYD306 based coating | 2.59 | 2.88 | 2.43 |

FIGS. 2 and 3 show linear trends in the evolution of sealability level with increasing level of HYD306. However, blocking of the film is increasing in the same way. A intermediate level between those 2 components allows to reach a good mix between sealability (for performance) and reduced blocking level (for processability).

EXAMPLE 5

Variant in the formulation of the coating has been done to provide similar performances as in Example 4 but with good level of moisture barrier. A 50%/50% blend of polylactic acid/caprolactone copolymer BE-450 and HYD306 supplied by Toyobo, was blended with nitrocellulose and with 5% Dymerex resin, 3% Paraffin wax and 2% calcined kaolin in solution. A cellophane reel was coated with this solution. Four variants of this formulation have been done. General properties of the film are displayed in table 4.

TABLE 5

Formulation work for improved moisture barrier coating

| Sample | Coat gain (g/m$^2$) | Wide Angle Haze (%) | Heat Seal Strength- 100° C. dry | Heat Seal Strength- 100° C. wet | Heat Seal Strength- 110° C. dry | Heat Seal Strength- 110° C. wet | Heat Seal Strength- 120° C. dry | Heat Seal Strength- 120° C. wet | Water Vapour Permeability (g/m$^2$/24 h) |
|---|---|---|---|---|---|---|---|---|---|
| Formulation 1 | 2.76 | 7.9 | 2.47 | 3.04 | 2.21 | 1.82 | 2.57 | 1.92 | 92 |
| Formulation 2 | 1.36 | 5.1 | 0.55 | 0.82 | 0.59 | 0.79 | 0.60 | 0.73 | 79 |
| Formulation 3 | 1.19 | 8.4 | 2.15 | 1.45 | 1.89 | 1.53 | 1.99 | 1.26 | 117 |
| Formulation 4 | 2.69 | 5.2 | 2.54 | 1.85 | 2.05 | 1.61 | 2.32 | 2.08 | 17 |

Table 5 clearly shows that by adjusting the formulation properly, it is possible to provide a coating which provides similar properties as in Example 4 with improved level of moisture barrier.

In this way it can be seen that the present invention provides a filmic lid for attachment to PLA based containers having advantages over such known lids so as to provide reasonable wet resistance, higher seal strengths, controlled moisture permeability and cover wider areas of PLA containers.

What is claimed is:

1. A packaging article comprising a peel seal film comprising a substantially biodegradable substrate and a coating comprising at least one copolymer of lactic acid and caprolactone, the peel seal film being sealed to itself and/or to a secondary substrate in a peelable manner to enclose a packaged product, wherein the at least one copolymer has a molecular weight in the range of from about 20,000 to about 50,000 and wherein the peel seal film is transparent with a wide angle haze of less than about 10%.

2. The packaging article according to claim 1, wherein the secondary substrate comprises part of the packaging article formed from PLA or from a composition comprising PLA.

3. The packaging article according to claim 1, wherein the packaging article is a container having at least one opening, and the peel seal film is sealed over said opening to close the container in an openable manner.

4. The packaging article according to claim 3, wherein the container is a rigid tray.

5. The packaging article according to claim 1, wherein the substantially biodegradable substrate of the peel seal film is selected from any suitably film-forming biodegradable material, or from mixtures of two or more thereof.

6. The packaging article according to claim 5, wherein the suitably film-forming biodegradable material is selected from cellulose and cellulosic derivatives, polymers of lactic acid and its derivatives, polymers of hydroxyalkanoates (PHAs) biodegradable polyesters, polycaprolactones and starch-based materials.

7. The packaging article according to claim 6, wherein the suitably film-forming biodegradable material is selected from cellulose and cellulose derivatives.

8. The packaging article according to claim 1, wherein the coating of the peel seal film comprises at least one wax.

9. The packaging article according to claim 8, wherein the wax is present in an amount of less than 10% w/w of the dry weight of the coating composition.

10. The packaging article according to claim 1, wherein the coating of the peel seal film comprises an antiblock additive.

11. The packaging article according to claim 10, wherein the antiblock additive is present in an amount of less than about 5% w/w of the dry weight of the coating composition.

12. The packaging article according to claim 1, wherein the at least one copolymer has a Tg in the range of from about −10° C. to about 50° C.

13. The packaging article according to claim 1, wherein the at least one copolymer has a hydroxyl group value in the range of from about 2 KOH mg/g to about 15 KOH mg/g.

14. The packaging article according to claim 1, wherein the coating comprises a blend of two or more copolymers of lactic acid and caprolactone.

* * * * *